United States Patent

[11] 3,632,138

| [72] | Inventor | William Paul Whiteley, Jr.<br>4525 E. 10th Lane, Hialeah, Fla. 33013 |
|---|---|---|
| [21] | Appl. No. | 587 |
| [22] | Filed | Jan. 5, 1970 |
| [45] | Patented | Jan. 4, 1972 |

[54] IMMERSIBLE BOAT TRAILER WITH BOAT CRADLING AND LATCHING MEANS
9 Claims, 11 Drawing Figs.

[52] U.S. Cl. .................................................. 280/405,
280/414, 280/80 B, 214/500
[51] Int. Cl. ................................................... B60p 3/10
[50] Field of Search ........................................... 214/505,
506, 84, 500; 280/414, 80 B

[56] References Cited
UNITED STATES PATENTS

| 2,332,326 | 10/1943 | Lex ............................... | 280/80 B |
| 2,506,699 | 5/1950 | Byrd .............................. | 280/414 |
| 2,711,259 | 6/1955 | Jones ............................. | 214/506 |
| 2,717,707 | 9/1955 | Martin ........................... | 280/80 B |
| 2,789,713 | 4/1957 | Agricola ........................ | 214/505 |
| 2,827,187 | 3/1958 | Elmore .......................... | 214/505 |
| 3,009,589 | 11/1961 | Martz ............................ | 214/505 X |
| 3,021,969 | 2/1962 | Peake et al. .................. | 280/414 X |
| 3,083,986 | 4/1963 | Moody et al. ................. | 214/506 X |

*Primary Examiner*—Albert J. Makay
*Attorney*—Ernest H. Schmidt

ABSTRACT: A boat trailer with an adjustable support bed for a boat, said trailer having coactive guide and latch structure operative in loading and unloading the boat, the boat loaded trailer being adapted to be positioned partially submerged in shallow water with the main boat support surfaces under the water to permit the boat to be floated onto or off of the trailer. Coactive latch structure on the boat and trailer permits semiautomatic latching together of the boat and trailer during the boat loading procedure. The latch means may be arranged in an unlatched disposition preparatory to launching the boat into the water. The trailer vehicle of the invention includes also wheel members mounted as a wheeled bogie unit which is adjustable relative to the fore and aft extension of the trailer. The wheel members each is provided with independent wheel suspension means, including torsion bar spring means.

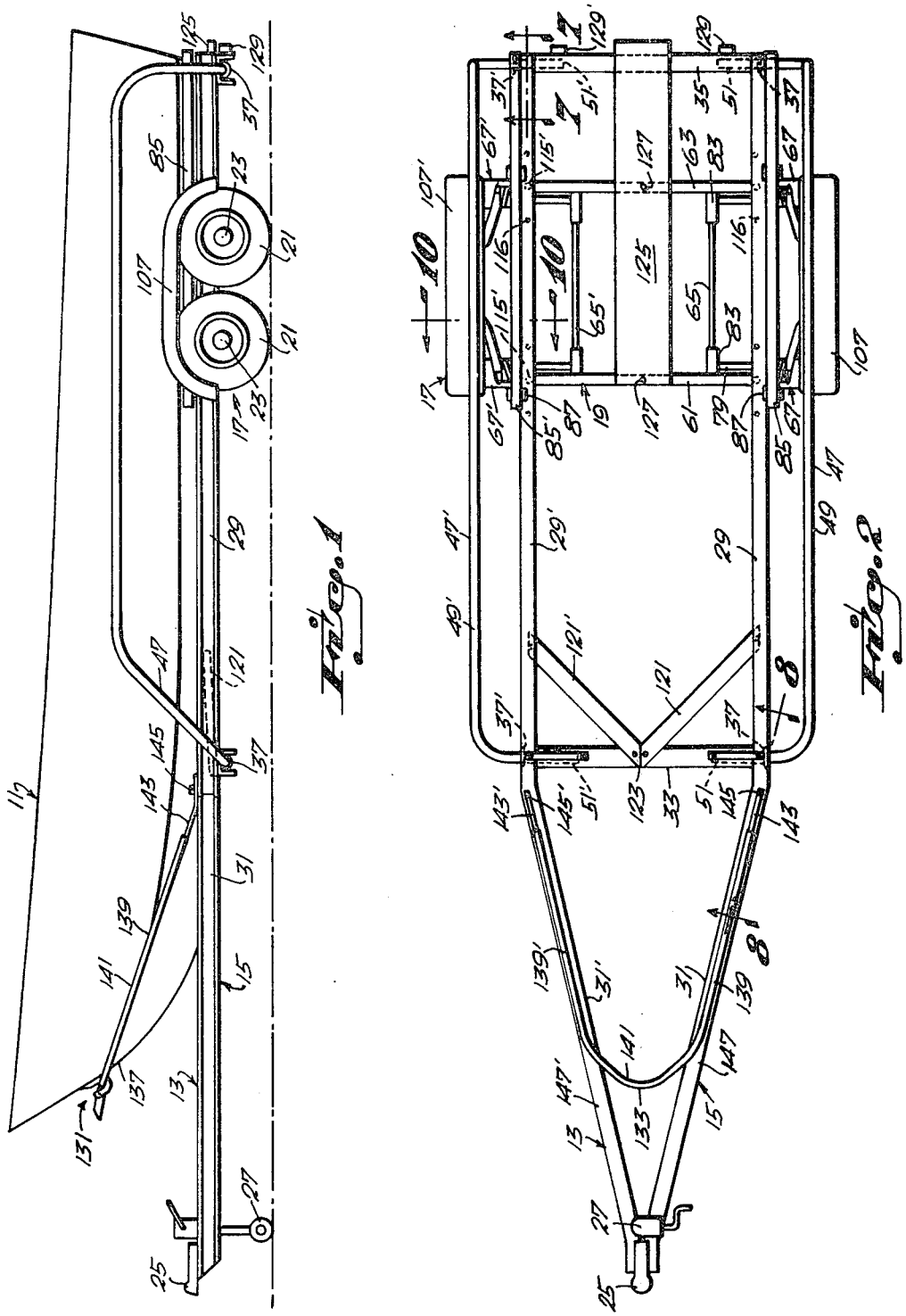

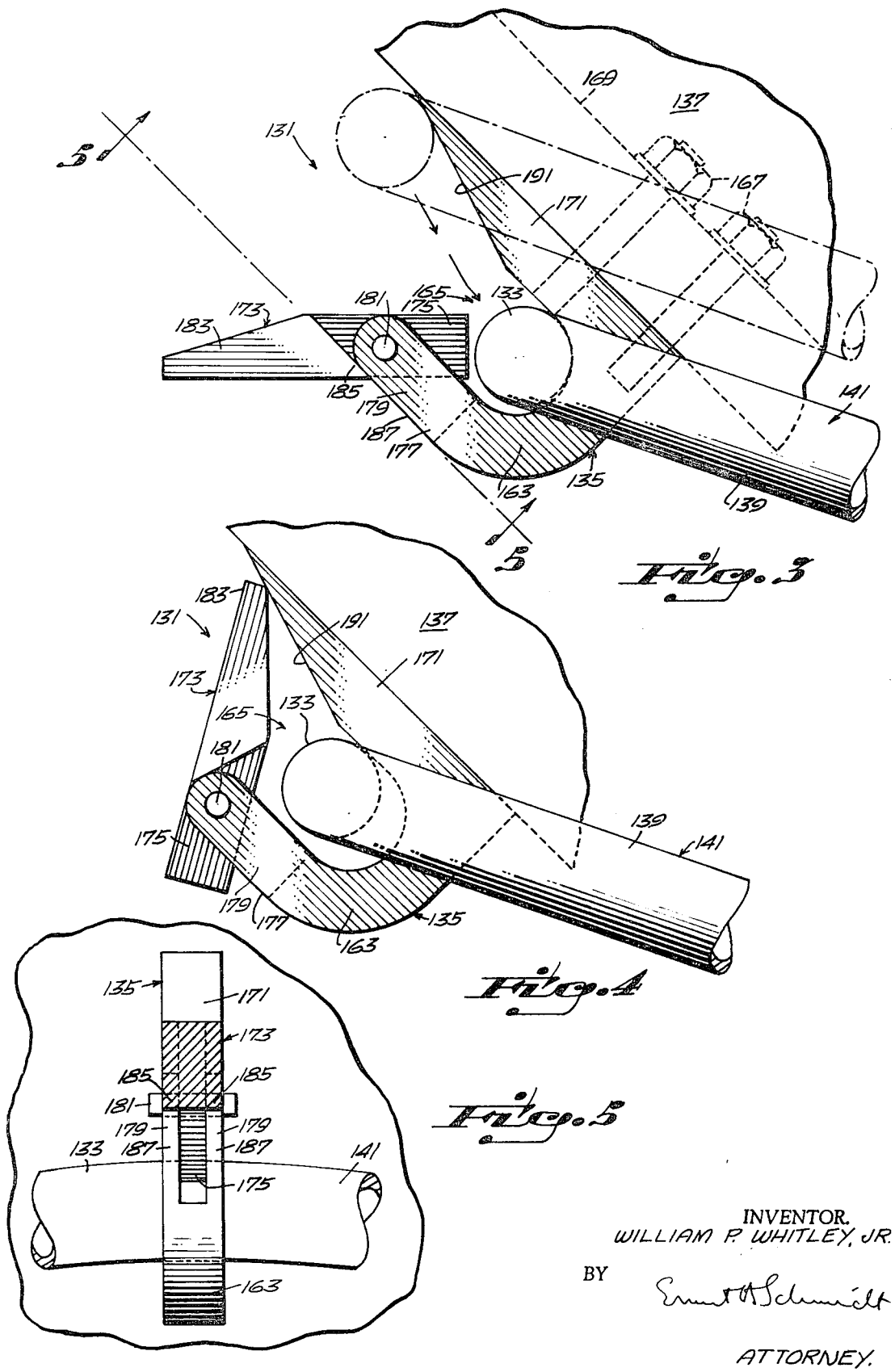

INVENTOR.
WILLIAM P. WHITLEY JR.

BY Ernest H Schmidt

ATTORNEY.

INVENTOR.
WILLIAM P. WHITLEY JR
BY
Ernest H Schmidt
ATTORNEY.

3,632,138

IMMERSIBLE BOAT TRAILER WITH BOAT CRADLING AND LATCHING MEANS

BACKGROUND OF THE INVENTION

The invention relates to fishing and boating generally and is particularly directed toward improvements in loading and unloading a boat onto and off of a boat trailer employing the practices of floating the boat onto or off of the boat trailer while it is partially submerged in the water.

SUMMARY OF THE INVENTION

The boat and boat trailer combination of the present invention provides ready means for quickly and easily loading and unloading a boat on a boat trailer. The boat may be unloaded or loaded on the trailer without the use of rope means and without undue manual manipulation of the boat. A single latch arrangement provides semiautomatically operative latch means for quickly and easily latching or unlatching the boat and trailer. The boat handling apparatus of the invention includes also longitudinally extending parallel-arranged guide rails supported on the trailer structure and operative for correctly positioning the boat over the trailer as the boat loading or unloading procedures are carried out. The guide rails position the floating boat during the loading operation and, in cooperation with bow centering guide means at the forward end of the supporting framework, correctly align the boat for engagement with the latch means arranged at the prow of the boat and the forward part of the trailer. The guide rail means also prevents wind and/or water currents from moving or drifting the boat away from the trailer while loading or launching the boat.

BRIEF DESCRIPTION OF THE DRAWING

FIG. 1 is a side elevational view of the boat and boat trailer combination of the present invention;

FIG. 2 is a top view of the trailer;

FIG. 3 is a fragmentary, side elevation of the latch means for latching the boat assembly on the trailer assembly, illustrated in a latched condition;

FIG. 4 is a view illustrating the latch means in an unlocked condition;

FIG. 5 is a fragmentary, oblique front view of the latch means taken as on the line 5—5 of FIG. 3;

DESCRIPTION OF THE PREFERRED EMBODIMENT

Figure 6:
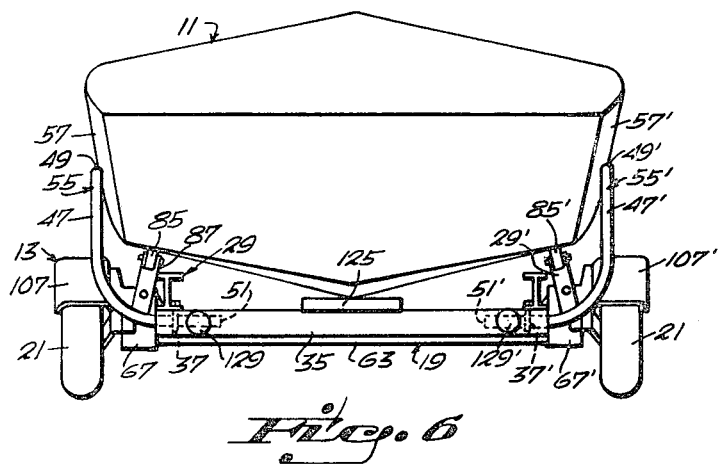
FIG. 6 is a rear elevational view of the boat and trailer apparatus of the invention.

The boat and trailer is indicated generally by numerals 11, 13 respectively and are adapted to be hitched to a towing vehicle (not shown) and trailingly drawn along a roadway surface in typical fashion.

The trailer assembly is indicated by the numeral 13 and basically includes a main frame 15 of open work construction; a wheeled bogie unit 17 including frame structure 19 and tandem arranged wheel, or single arranged wheel, and spindle assemblies 21, 23; hitch coupling means 25 adapted for detachable connection with a towing vehicle (not showing); and jack means 27 operative in typical fashion for supporting the forward end of the trailer assembly when it is disconnected from a towing vehicle.

Figure 7:
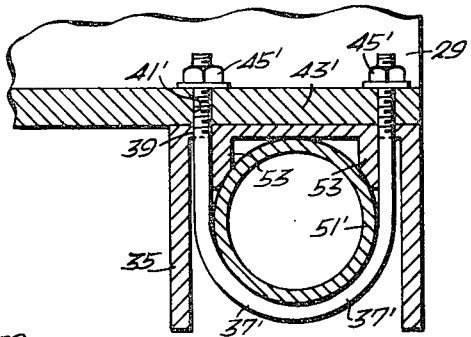
FIG. 7 is a vertical plane sectional view taken as on the line 7—7 of FIG. 2.

The main frame 15 of trailer assembly 13 includes parallel-arranged, longitudinally extending side members 29, 29' rigidly integrally joined respectively at the forward end portions thereof to converging frame tongue members 31, 31'. Main frame members 29, 31; 29', 31' preferably are of I-beam configuration and are rigidly joined at the forward apex, at which location jack means 27 are provided. A forward crossmember 33 and a rearward crossmember 35 rigidly interconnect respectively the forward and rearward portions of longitudinal side members 29, 29', and are suitably joined together by U-bolt fastening members 37, 37; 37', 37'. A side view of the U-bolt attachment means at the rearward right portion of main frame 15 is illustrated in FIG. 7. This figure illustrates U-bolt 37' extending upwardly through aligned apertures 39 and 41' formed respectively in crossmember 35 and the lower flange 43' of frame side member 29'. Crossmembers 33, 35 each are of like configuration and preferably are inverted U-shaped in transverse section (see FIG. 7). The opposite ends of the forward and rearward crossmembers 33, 35 each are clampingly and dependingly secured transversely on the corresponding forward and rearward portions of frame side members 29, 29'. In the embodiment shown, the threaded nut means, as nut means 45', 45', engage the respective U-bolt members 37, 37' and clampingly secure the crossmembers 33, 35 subadjacently on the main frame side members. Cradle means defining a nest or bed for a boat to be trailed on the trailer are also provided and are now to be described.

Guide rails 47, 47' are rigidly supported generally in parallel arrangement longitudinally of and respectively on opposite sides and above the main plane of the trailer assembly 13. The leftward and rightward arranged guide rails 47, 47' include respectively horizontal boat hull fender sections 49, 49' and forward and rearward guide rail end mounting sections 51. 51; 51', 51'. Preferably, the U-bolt members 37, 37; 37', 37', in addition to providing screw fastening means for joining the members of the main frame 15, also provides clamp means for receiving the mounting sections of the left and right guide rail members 47, 47'. The guide rail end mounting sections 51, 51; 51', 51' respectively of left and right guide rails 47, 47' are clampingly received respectively in opposite end portions of crossmembers 33, 35. By way of example, FIG. 7 illustrates the means for rigidly supporting the rearward guide rail end section 51' of right guide rail 47' on rearward frame crossmember 35. Crossmember 35 is provided with a parallel-spaced pair of depending rib portions 53, 53, which are adapted to provide a clamp seat to engage the exterior cylindrical surfaces respectively of left and right guide rail mounting sections 51, 51'. Loosening U-bolts members 37, 37; 37', 37' by manipulation of nut means 45', 45' permits symmetrical lateral adjustment and converging or diverging movement of guide rails 47, 47' and the adjustment of the guide rail spacing for accommodating the width of a particular boat to be transported.

The horizontally extending boat hull fender sections 49, 49' respectively of guide rails 47, 47' preferably are fitted with a plastic sleeve covering (not illustrated) for engagement with the opposite side surfaces 57, 57' of boat assembly 11.

Wheeled means are provided for the trailer assembly, and, as shown in the preferred embodiment, may include a wheeled bogie unit 17 adjustably secured along the underside of the rearward part of trailer assembly 13. To this end, adjustable attachment means is provided, as is hereinafter described for attaching bogie unit 17 to trailer frame 15 to permit fixed securement of the bogie unit at a selected disposition along the longitudinal extension of the trailer frame and adjustably by fore and aft movement of the bogie unit relative to the center of gravity of the load or boat assembly 11. Fore and aft adjustment of bogie unit 17 affords ready means for regulating the weight carried by the rear wheels of the towing vehicle.

Referring more in detail to the bogie unit, the frame 19, as seen in plan in FIG. 2, includes forwardly and rearwardly disposed oppositely facing parallel channel members 61, 63. Compound bracket elements 67, 67; 67', 67' are stationarily fitted respectively on opposite end portions of forward and rearward members 61, 63 of bogie frame 19. Compound bracket elements 67, 67; 67', 67' are disposed in generally rectangular-spaced disposition with each bracket element supporting a wheel and axle assembly 21, 23 or 21', 23'. Each bracket element 67, 67; 67', 67' is substantially of like design and configuration with each other compound bracket element and the following general description of bracket element 67' of the left rearward wheel and axle assembly 21', 23' will suffice also as a description of the other bracket elements (see FIGS. 2, 10 and 11).

Compound bracket element 67' is provided with a transversely extending rectangular throughway 69 of size and configuration for snugly receiving the the left end portion of rearward frame member 63 of bogie frame 19. A wheel suspension arm 75 supported in bearing means 77 formed in bracket element 67' provides pivotal crank arm type support means for wheel and axle assembly 21', 23'. A transversely extending torsion bar member 79, which may be hexagonal in cross-sectional shape, as illustrated, is fixedly secured at one end portion thereof to the wheel suspension arm bearing portion 81 and is anchored at the other end thereof to one end of a longitudinally extending stabilizer or connector bar 65'. The other end of the stabilizer or connector bar 65' is secured to the corresponding end of the transversely extending torsion bar member 79 of the tandem associated axle assembly 21', 23', whereby said tandem wheel assembly in operation, will impart to the ends of said stabilizer bar, opposed, reactive stresses which will tend to balance and be absorbed therein instead of imposing any appreciable torsional stresses to the side members 29, 29' of the trailer frame assembly 15. My copending U.S. Pat. application, Ser. No. 587,685, filed Sept. 1, 1966, and tilted TORSION BAR SUSPENSION FOR TRAILERS AND THE LIKE illustrates and describes in greater detail such torsion bar and stabilizer mechanism suitable for trailers embodying the present invention.

The intermediate or central portion 84 of bracket element 67' is generally platelike in form and is adapted for supporting a horizontal boat chock rail 85. Chock adjustment means are provided which include a channel-shaped strut member 87 which is adjustably secured to bracket plate portion 84 by bolt means 89, 91. The upper flange portion of strut member 87 is cut out for receiving chock rail 85. Bolt means 93 extending through aligned apertures in strut member flange portions 95, 95, clampingly secure the rail 85 transversely on the upper extension of strut 87. A striplike pad element 97 is fixedly secured along the upper surface of rail 85 by staple means 99. Adjustment means provided to orient the chock means described into cradle-defining orientation to nest the boat to be trailed, said means comprising adjustably manipulating pivot bolt means 89, and swing bolt means 91 of support strut 87 which permits pivotal adjustment of the support surface of chock rail inward or outward relative to the longitudinal axis of the boat trailer and affords means for adjusting the flat supporting surface 101 of pad element 97 to nest the slanted boat bottom surface 103 (see FIG. 10). It will be noted that the left and right chock rails 85, 85 are each supported by a pair of strut members 87, 87 supported in turn from respective compound bracket elements 67, 67; 67', 67' (see FIG. 2).

Each compound bracket element also preferably is provided at its upper extremity with an upwardly projecting flange portion 105 adapted to supported a wheel guard fender 107. The wheel guard is supported on the bracket by threaded fasteners 109, 109 extending through the fender flange 111 and bracket flange portion 105. The leftward and rightward arranged wheel guards 107, 107' each are generally of inverted U-configuration and each are stationarily supported relative to the trailer frame 15 by the respective bracket elements 67, 67; 67', 67'.

Figure 10:
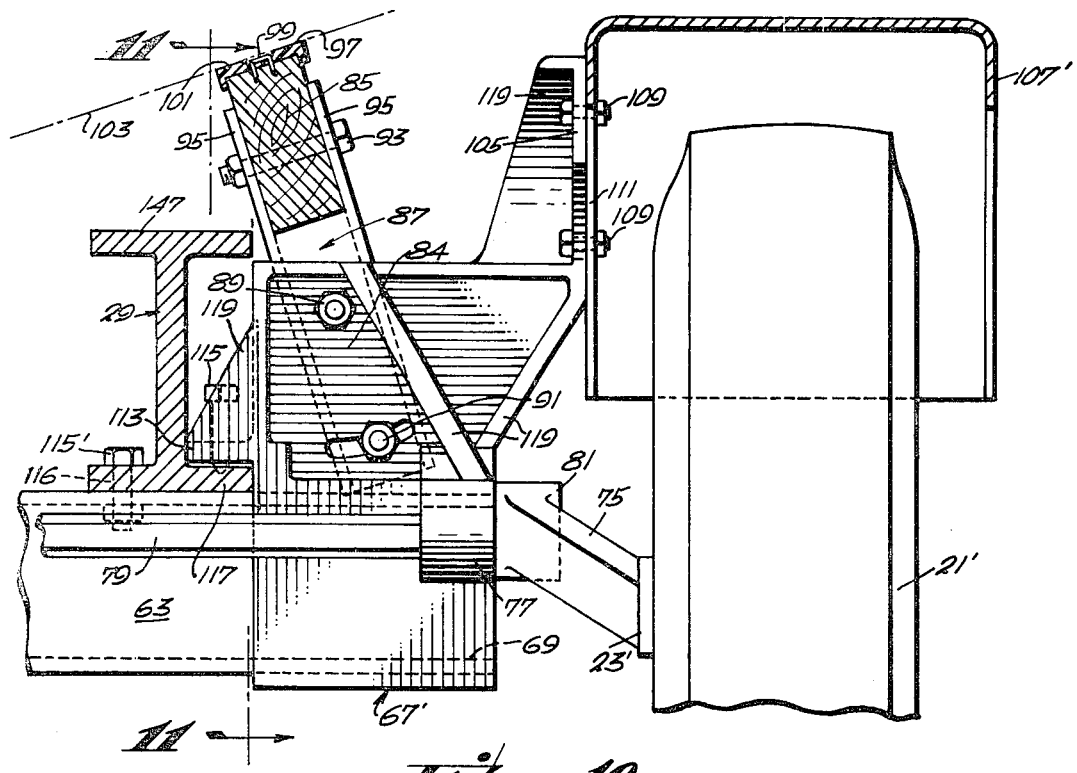
FIG. 10 is a fragmentary sectional view of a portion of the tandem-wheeled bogie unit of the invention.
Figure 11:
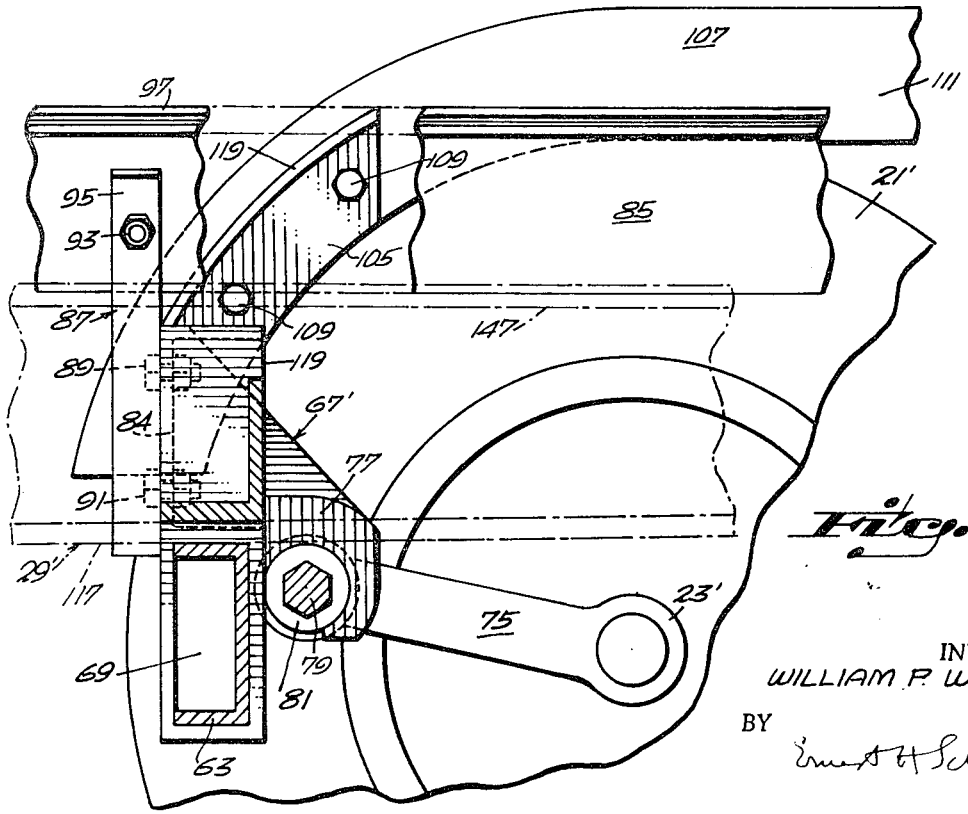
FIG. 11 is a sectional view taken as on the line 11—11 of FIG. 10.

Each compound bracket element also preferably includes a flange stop portion 113 closely spaced superadjacently of the lower outside anchor flange portion 117 of the trailer frame longitudinal side member 29. As illustrated in FIGS. 2 and 10, a plurality of bolt holes 116 are provided in spaced relation and transversely aligned along the lower flange portions 117 of the frame longitudinal side members 29, 29' for adjustably placed attachment, as by bolts 115', of the bogie units 17 to the trailer frame 15 for the purpose hereinabove described. Lock screws 115 threaded through flange stop portions 113 and adapted to be advanced into abutting engagement with upper surface portions of the lower flange 117 prevent transverse displacement of the bogie unit mechanism. The compound bracket elements 67, 67; 67', 67' are each preferably formed with flange or webb portions 119 which strengthen or reinforce each bracket element.

Referring to FIG. 2, the trailer assembly 13 preferably is provided with a V-arranged pair of bow guide and support members 121, 121' fixedly secured substantially horizontally by screw means 123 on forward member 33 and left and right members 29, 29' of trailer frame 15. The V-arranged bow guide and support members 121, 121', which converge to an apex at a somewhat higher level than that of the plane of attachment of the terminal ends of the legs to the trailer frame, provide means for guiding entry of the bow part of the boat when the boat is being loaded and for supporting it when the boat is in a transportable disposition (see FIGS. 1 and 2). The trailer assembly 13 also preferably is fitted with a horizontally extending skid board 125 fixedly secured by screw means 127 transversely symmetrically on forward and rearward frame members 61, 63 of the wheeled bogie unit. The rearward end portion of skid board 125 preferably is unattached and may restingly engage the upper surface of rearward crossmember 35 of the trailer frame. The construction permits longitudinal adjustment of bogie unit 17 as hereinabove described, and longitudinal movement of skid board 125 relative to trailer frame rearward member 35. The trailer assembly also preferably is provided with electric tail lights or safety lamps 129, 129' supported on crossmember 35 of the trailer frame.

The invention also includes semiautomatically operative latch means for latching boat assembly 11 on trailer assembly 13. The latch means is indicated generally in FIGS. 3 and 4 and by numeral 131. It includes two main coacting portions: (1) a curved latch bar portion 133 supported upon the forward portion of the trailer assembly frame 15, and (2) a latch catch mechanism 135 supported on the prow 137 of boat assembly 11 (see FIGS. 1–5).

Referring first to the latch bar portion 133, it is U-shaped as seen in plan, with the bight being elevated and with the legs 139, 139' extending rearwardly and downwardly to permit of attachment to the frame. Latch bar portion 133 and its extension legs portions 139, 139' preferably are integrally formed of tubular stock and define a generally U-configured bow stop member 141 supported on the forward frame portion of the trailer assembly, as will now be described with reference to FIG. 8. A pair of support strap members 143, 143' are fixedly secured by bolt means 145, 145' respectively on flange portions 147, 147' of I-sectioned longitudinal frame members 29, 29'. The forwardly and upwardly projecting support strap members 143, 143' are telescopically received in the open rearward end portions respectively of the bow stop member leg portions 139, 139' and cantilever support said bow stop members in a forwardly and upwardly extending disposition (see FIGS. 1, 2 and 8). Support members 143, 143' preferably are formed of steel strap stock for permitting upward and downward movement of latch bar portion 133 relative to frame structure 15 of the trailer assembly; vertical displacement of curved latch bar portion 133 permits ready engagement and disengagement thereof with latch catch mechanism 135 (see FIG. 3).

Figure 9:
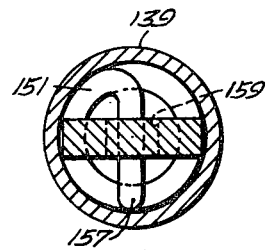
FIG. 9 is a transverse sectional view of the shock absorbing spring means taken as on line 9—9 of FIG. 8.
Figure 8:
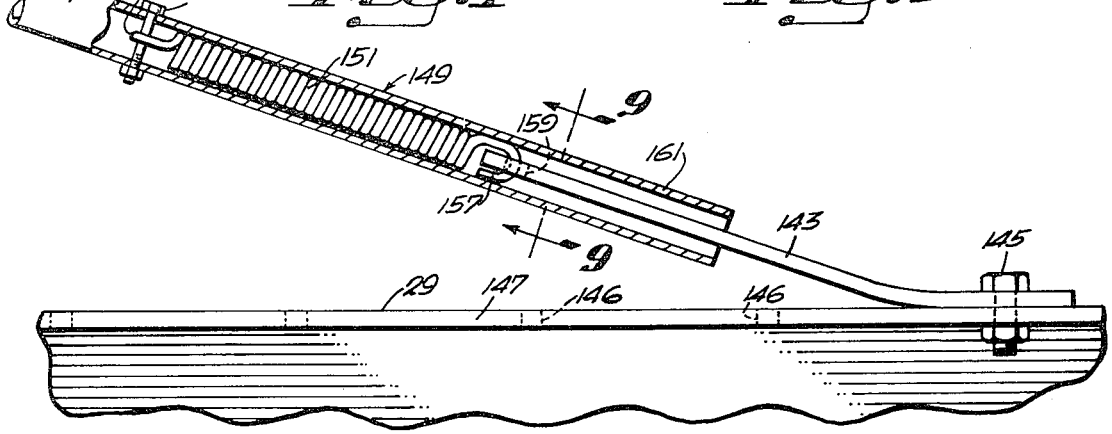
FIG. 8 is an elevational view, partly in section, and taken along the line 8—8 of FIG. 2, illustrating the shock spring means of the apparatus.

The bow stop member 141 is preferably includes resiliently tractile shock absorber means normally resiliently urging latch bar portion 133 rearwardly relative to the trailer assembly; this means includes a helical tension spring 151 operably fitted in the rearward tubular end portions respectively of leftward and rightward arranged bow stop member leg portions 139, 139' of bow stop member 141. FIGS. 8 and 9 illustrate leftward arranged shock absorber means 149 and a description of this shock absorber means supported in bow stop member leg portions 139'.

Shock absorber means 149 includes a helical extension spring 151 loosely telescopically received in the tubular exterior of bow stop member leg portion 139. The inwardly arranged hooked-end portion 153 of spring 151 is secured by an anchor bolt 155 extending diametrically through the bow stop member leg portion 139. The outwardly arranged hooked portion 157 of spring 151 is secured in an aperture 159 formed in the distal end of support strap 143. The shock absorber extension spring 151 normally is in a fully collapsed disposition and when so arranged the terminal portion 161 of bow stop member leg portion 139 extends a substantial distance over the cantilever supported end of support strap 143 (see FIG. 8).

Means is provided for adjustably securing the bow stop member 141 along the front portion of the frame structure 15 of the trailer assembly in accordance with the length of the boat to be transported. To this end, a plurality of transversely aligned bolt holes 146 are provided along the flange portions 147, 147' of frame members 29, 29' for selective use as required, (see FIG. 8).

Now referring to FIG. 3, the latch catch mechanism 135 includes a U-shaped throat member 163 defining a recess opening forwardly and upwardly relative to the major axis of the boat assembly. Threaded fasteners 167, 167, extending through the prow wall 169 of the boat assembly threadedly engage the base portion 171 of throat member 163 and stationarily secure the throat member to the boat assembly. The recess 165 of the throat member is adapted to removably receive the latch bar portion 133 of bow stop member 141 in unloading and loading boat assembly 11 on trailer assembly 13.

Mechanism 135 includes a pawl member 173 having an abutment lock portion 175 adapted to abuttingly engage and retain latch bar portion 133 in throat member recess 165, when in the attitude shown in FIG. 3. In the preferred embodiment, as seen in FIG. 5, the lower projection 177 of throat structure 163 is bifurcated and defines a pair of forwardly and upwardly extending tab portions 179, 179. The pawl member 173 is pivotally supported by horizontal pin means 181 from throat member projection 177 and with the pawl abutment lock portion 175 being freely turnably received between the tab portions 179, 179 of throat member 163 (see FIGS. 3-5).

The latch means 131 generally is arrangeable in a locked or unlocked disposition (see respectively FIGS. 3 and 4). When the latch means is in a locked disposition, latch bar portion 133 of bow stop member 141 is received fully in recess 165 of throat member 163 and the pawl member abutment lock portion 175 is arranged partially across the recess (see FIG. 3). The pawl member 173 includes weight mass structure 183 operative for causing abutment lock portion 175 to be pivotally urged into its limit position (as seen in FIG. 3) to partially block recess 165. As viewed in FIG. 3, the weight structure 183 tends to cause pawl member 173 to move in a counterclockwise direction and to a stopped or limit disposition whereat the pawl member stop portions 185, engage the undersurfaces 187, respectively of tab portions 179. The latch means may be arranged in an unlocked disposition by finger-lifting the pawl member to turn clockwisely from the position shown in FIG. 3 to the position shown in FIG. 4. When pawl member 173 is in an unlocked disposition, weight mass structure 183 is canted rearwardly of the pawl member pivot axis and is maintained in this canted disposition by engagement with the cam surface 191 of throat member base portion 171 (see FIG. 4). The arrangement of the weight mass structure 183 and the relative configuration and positioning respectively of throat member 163 and pawl member 173 defines gravity operative detent means for holding the pawl member in an unlocked disposition.

In use, removing the boat from the trailer and launching it into the water, can be easily and quickly accomplished as follows: The trailer-boat combination is just reversed or backed rearwardly down the bank of the body of water into which the boat is to be launched. The towing vehicle is then halted at a position whereat the boat and trailer are located perpendicularly alongside the edge of the body of water, and latch means 131 will be manually flipped up into an unlocked position (see FIG. 4). The towing vehicle may then be reversed further and to a position whereat the boat assembly floats free of the trailer assembly chock rails 85, 85 and is maintained in position over the trailer by guide rails 47, 47'. The boat motor may then be started and the boat reversed and moved rearwardly from over the trailer assembly and from between guide rails 47, 47'. As the boat is reversed, latch mechanism throat member 163 disengages from latch bar portion 133, and the relative movement of said latch bar position simultaneously engages and pivotally returns pawl member 173 into its latching disposition, (as seen in FIG. 3).

When it is desired to load the boat onto the partially submerged trailer, the following procedure may be carried out: The boat will be power-driven an piloted between parallel guide rails 47, 47' which, if required, will generally guide the boat in its straight-ahead direction, whereafter, upon the bow of the boat passing into and over the angular bow guide and support members 121, 122 it will be guided thereby to slide forwardly centrally of the trailer so that the latch mechanism throat member 163 engages with latch bow portion 133 to lock itself in position, as illustrated in FIG. 3. In this connection it will be understood that the latch bow portion 133 will be of such height prior to latching, as illustrated by the broken line representation thereof in FIG. 3, that it will automatically be moved down by cam action along the prow of the boat. Continuing forward movement of the boat engages cam surface 191 of throat member 163 with the latch bar portion 133, thereby depressing it further and sequentially engaging and pivotally moving pawl member 173. The latch bar portion 133 of bow stop member 141 moves over or past pawl member abutment lock portion 175, whereupon the weight structure 183 pivotally moves the pawl member 173 counterclockwisely to a locked disposition again. The boat and trailer combination may then be hauled from the water by a towing vehicle and trailingly conveyed to a desired location.

While I have illustrated and described herein only one form in which my invention may conveniently by embodied in practice, it is to be understood that this form is given by way of example only and not in a limiting sense. My invention, in brief, comprises all the embodiments and modifications coming with the scope and spirit of the following claims.

What I claim as new and desire to secure by Letters Patent is:

1. An immersible boat trailer for float-off launching and float-on loading of a boat comprising, in combination, a trailer frame, cradle means on said trailer frame for supporting the hull of a boat to be transported, hitch means at the front end of said trailer frame for connection with a transporting vehicle, wheel means secured to the underside of said trailer frame near the rear end thereof for rollably supporting said trailer frame, means at each side of said cradle means for guiding the sides of a boat into proper loading position on said trailer means, guide means near the front end of said trailer frame for guiding the bow of a boat to be loaded into centrally loaded position on the trailer, and latch means for automatically securing the prow of the boat being loaded with respect to the trailer upon reaching the fully loaded position thereon, said latch means comprising a substantially U-shaped bow stop member, means for longitudinally adjustably securing the opposed open end leg portions of said bow stop member to laterally opposed front portions of said trailer frame, a latch catch member adapted to be centrally secured to the prow of a boat to be loaded and having a forwardly and upwardly directed throat opening for the reception of the bight portion of said bow stop member and means for automatically locking said bow stop member with respect to said catch member upon said bight portion thereof being received in said throat opening.

2. An immersible boat trailer as defined in claim 1, wherein said wheel means comprises a bogie unit having a bogie frame, at least one wheel at each side of said bogie frame, and torsion bar mechanism resiliently mounting said wheels with respect to said bogie frame for close-to-ground support of said trailer frame.

3. An immersible boat trailer as defined in claim 1, wherein said wheel means comprises a bogie unit having a bogie frame, a pair of tandem wheels at each side of said bogie frame, and torsion bar mechanism resiliently mounting each of said tandem wheel pairs with respect to said bogie frame for close-to-ground support of said trailer frame.

4. An immersible boat trailer as defined in claim 3, wherein each of said torsion bar mechanism comprises a pair of torsion bar members laterally extending and longitudinally spaced with respect to said trailer frame, said pair of torsion bar members being interconnected at corresponding ends by a common connector bar, and a pair of wheel suspension arms one end of each of which is connected to one each of the other ends of said torsion bar members to extend substantially radially outwardly thereof and the other ends of which are provided with sidewardly extending spindles for journaling one each of said wheels.

5. An immersible boat trailer as defined in claim 2, including means for adjustably securing said bogie unit along the length of said trailer frame in accordance with the length and center of gravity of any particular boat to be transported.

6. An immersible boat trailer as defined in claim 1, wherein said cradle means comprises a pair of spaced, paralleled, longitudinally extending chock rails adapted to receive seated thereagainst hull bottom side portions of a loaded boat.

7. An immersible boat trailer as defined in claim 6, including means for adjustably securing said chock rails in their longitudinally extending positions to accommodate boats of various width and hull bottom shape.

8. An immersible boat trailer as defined in claim 1, including means for adjustably securing said rail members both with respect to their distance above said cradle means and their distance to each side of said cradle means to accommodate boats of various sizes and shapes.

9. Am immersible boat trailer as defined in claim 1, wherein said locking means comprises a latch pawl pivotally journaled to said latch catch member at the open end of said throat opening, said latch pawl, when in locking position being manually rotatable, selectively, between locking and unlocking stable positions, said latch pawl when in said unlocking position, being automatically rotated to said locking position upon a bight portion of said bow stop member withdrawing from said throat opening.

* * * * *